US012810324B2

(12) United States Patent
Shtoff

(10) Patent No.: US 12,810,324 B2
(45) Date of Patent: Nov. 24, 2026

(54) SYSTEM AND METHOD FOR LOW RANK FIELD-WEIGHTED FACTORIZATION MACHINE AND APPLICATION THEREOF IN CONTENT RECOMMENDATION

(71) Applicant: YAHOO ASSETS LLC, New York, NY (US)

(72) Inventor: Alex Shtoff, Haifa (IL)

(73) Assignee: YAHOO ASSETS LLC, New York, NY (US)

( * ) Notice: Subject to any disclaimer, the term of this patent is extended or adjusted under 35 U.S.C. 154(b) by 0 days.

(21) Appl. No.: 18/467,400

(22) Filed: Sep. 14, 2023

(65) Prior Publication Data

US 2025/0095024 A1 Mar. 20, 2025

(51) Int. Cl.
*G06Q 30/0242* (2023.01)
*G06Q 30/0202* (2023.01)
*G06Q 30/0241* (2023.01)
*G06Q 30/0273* (2023.01)

(52) U.S. Cl.
CPC ..... *G06Q 30/0246* (2013.01); *G06Q 30/0202* (2013.01); *G06Q 30/0275* (2013.01); *G06Q 30/0277* (2013.01)

(58) Field of Classification Search
CPC ........... G06Q 30/0246; G06Q 30/0202; G06Q 30/0275; G06Q 30/0277
See application file for complete search history.

(56) References Cited

U.S. PATENT DOCUMENTS 11,113,707 B1 * 9/2021 Sharma .............. G06Q 30/0205
11,170,005 B2 * 11/2021 Kota ................... G06F 16/9024
2005/0102195 A1 * 5/2005 Kuehr-McLaren .......................... G06Q 50/188 705/26.2
2009/0240600 A1 * 9/2009 Soulanille .......... G06Q 30/0256 707/999.005
2017/0061452 A1 * 3/2017 Mukherjee ........... G06Q 10/087
2017/0083522 A1 * 3/2017 Somekh ................... G06N 7/01
(Continued)

FOREIGN PATENT DOCUMENTS

EP 3920100 A1 * 12/2021 ........... G06F 16/334
JP 5507607 B2 * 5/2014
(Continued)

OTHER PUBLICATIONS

Z. Chen, H. Tian, G. Nie and B. Liu, "AWMF: All-Weighted Metric Factorization for Collaborative Ranking," 2020 IEEE Symposium on Computers and Communications (ISCC), Rennes, France, 2020, pp. 1-6, doi: 10.1109/ISCC50000.2020.9219620. (Year: 2020).*
(Continued)

*Primary Examiner* — Ilana L Spar
(74) *Attorney, Agent, or Firm* — Venable LLP

(57) ABSTRACT

The present teaching relates to online advertising. A diagonal vector d is determined based on supply and demand data identified from ad auction related data. A predicted performance (P-P) metric is computed based on the diagonal vector d via low rank field weighted factorization machines (FwFM) for each of candidate ads included in the ad auction related data. The candidate ads are ranked based on their corresponding P-P metrics. A winning ad is selected from the ranked candidate ads according to a predetermined selection criterion.

14 Claims, 9 Drawing Sheets

(56) References Cited

U.S. PATENT DOCUMENTS

| | | | | |
|---|---|---|---|---|
| 2022/0383126 A1* | 12/2022 | Chen | .................... | G06N 3/084 |
| 2023/0106213 A1* | 4/2023 | Hsu | .................... | G06N 3/096 706/12 |

FOREIGN PATENT DOCUMENTS

| | | | | |
|---|---|---|---|---|
| JP | 6464057 B2 * | 2/2019 | ............ | G06N 20/00 |
| WO | WO-2009145845 A1 * | 12/2009 | ............ | G06Q 30/02 |

OTHER PUBLICATIONS

W. Wu et al., "IBFM: An Instance-weight Balanced Factorization Machine for Sparse Prediction," 2021 International Conference on Data Mining Workshops (ICDMW), Auckland, New Zealand, 2021, pp. 85-93, doi: 10.1109/ICDMW53433.2021.00017. (Year: 2021).*

Pan et al, "Field-weighted Factorization Machines for Click-Through Rate Prediction in Display Advertising", WWW '18: Proceedings of the 2018 World Wide Web Conference, Apr. 2018, pp. 1349-1357, https://doi.org/10.1145/3178876.3186040 (Year: 2018).*

Chen, Xiaoshuang, et al. "RaFM: rank-aware factorization machines." International Conference on Machine Learning. PMLR, 2019. (Year: 2019).*

* cited by examiner

600

SYSTEM AND METHOD FOR LOW RANK FIELD-WEIGHTED FACTORIZATION MACHINE AND APPLICATION THEREOF IN CONTENT RECOMMENDATION

BACKGROUND

1. Technical Field

The present teaching generally relates to data analytics. More specifically, the present teaching relates to data analytics in content recommendation.

2. Technical Background

With the development of the Internet and the ubiquitous network connections, more and more commercial and social activities are conducted online. Networked content is served to millions, some requested and some recommended. Platform operators that make electronic content available to users may leverage their online presence to solicit advertisements (ads) to be displayed together with content to users. For each of such ad display opportunity, mechanisms may be put in place where advertisers may bid for the opportunity to display their ads, which may be evaluated on-the-fly with respect to, e.g., estimated performance of each bid ad so that a winning ad may be selected based on the estimated performance. In an online ad auction, a winning ad may be recommended and such a process of recommending a winning ad is to match supply with demand.

This is illustrated in FIG. 1, where supply involves users 100-1 and the contexts around the users 100-2 and demand involves ads and information associated therewith 100-3. User data 100-1 may relate to demographics of online users such as age, gender, . . . , and preferences of the users. Contextual information 100-2 relating to a display ad opportunity associated with a user may include the geo-region the user is currently at, the platform (Yahoo) on which the display ad opportunity arose, . . . , and possibly certain social media settings associated with the opportunity. Data associated with each ad on the demand side may include, e.g., a category of the ad (e.g., electric vehicle), targeted demographics (e.g., young professionals), . . . , as well as certain regional promotions (e.g., 2% promotion in several cities).

Due to the on-the-fly nature associated with online advertising, the computations that enables online ad auction is generally very large scale with a certain required level of latency (low). Field-weighted factorization machines (FwFM) are commonly used in such large scale and low latency recommender systems. However, to save computational time to meet the low latency constraints, field interactions in such systems are often pruned, producing sub-optimal results, making it difficult to control recommendation quality. Thus, there is a need for a solution that can enhance the performance of the traditional approaches.

SUMMARY

The teachings disclosed herein relate to methods, systems, and programming for information management. More particularly, the present teaching relates to methods, systems, and programming related to online advertising.

In one example, a method, implemented on a machine having at least one processor, storage, and a communication platform capable of connecting to a network for online advertising. A diagonal vector d is determined based on supply and demand data identified from ad auction related data. A predicted performance (P-P) metric is computed based on the diagonal vector d via low rank field weighted factorization machines (FwFM) for each of candidate ads included in the ad auction related data. The candidate ads are ranked based on their corresponding P-P metrics. A winning ad is selected from the ranked candidate ads according to a predetermined selection criterion.

In a different example, a system is disclosed for online advertising that includes a low rank field-weighted factorization machine (FwFM) predicted performance (P-P) metric determiner, a P-P metric based ad ranking unit, and a winning ad selection unit, The low rank FwFM P-P metric determiner is provided for processing ad auction related data to identify supply data and demand data, determining a diagonal vector d based on the supply data and the demand data, and computing a predicted performance metric via low rank FwFM for each of a plurality of candidate ads included in the ad auction related data based on the diagonal vector d. The P-P metric based ad ranking unit is provided for ranking the plurality of candidate ads based on their corresponding predicted performance metrics. The winning ad selection unit is provided for selecting one of the ranked plurality of candidate ads as a winning ad according to a predetermined selection criterion.

Other concepts relate to software for implementing the present teaching. A software product, in accordance with this concept, includes at least one machine-readable non-transitory medium and information carried by the medium. The information carried by the medium may be executable program code data, parameters in association with the executable program code, and/or information related to a user, a request, content, or other additional information.

Another example is a machine-readable, non-transitory and tangible medium having information recorded thereon for online advertising. The information, when read by the machine, causes the machine to perform the following steps. A diagonal vector d is determined based on supply and demand data identified from ad auction related data. A predicted performance (P-P) metric is computed based on the diagonal vector d via low rank field weighted factorization machines (FwFM) for each of candidate ads included in the ad auction related data. The candidate ads are ranked based on their corresponding P-P metrics. A winning ad is selected from the ranked candidate ads according to a predetermined selection criterion.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or system have been described at a relatively high-level, without detail, in order to avoid unnecessarily obscuring aspects of the present teachings.

The present teaching discloses an alternative low rank FwFM approach that reduces the rank of the field-interaction matrix rather than pruning small field-interaction weights as in the conventional solutions. The low rank FwFM approach according to the present teaching allows faster scoring of predicted performance metrics even with multi-value fields with a much-simplified computation construct and process, yet maintains the accuracy enjoyed when deploying FwFM. The low rank FwFM as disclosed herein achieves integration of multi-value features in prediction more effectively and, thus, better supports online advertising with real-time performance-based ad ranking and recommendation.

Figure 2A:
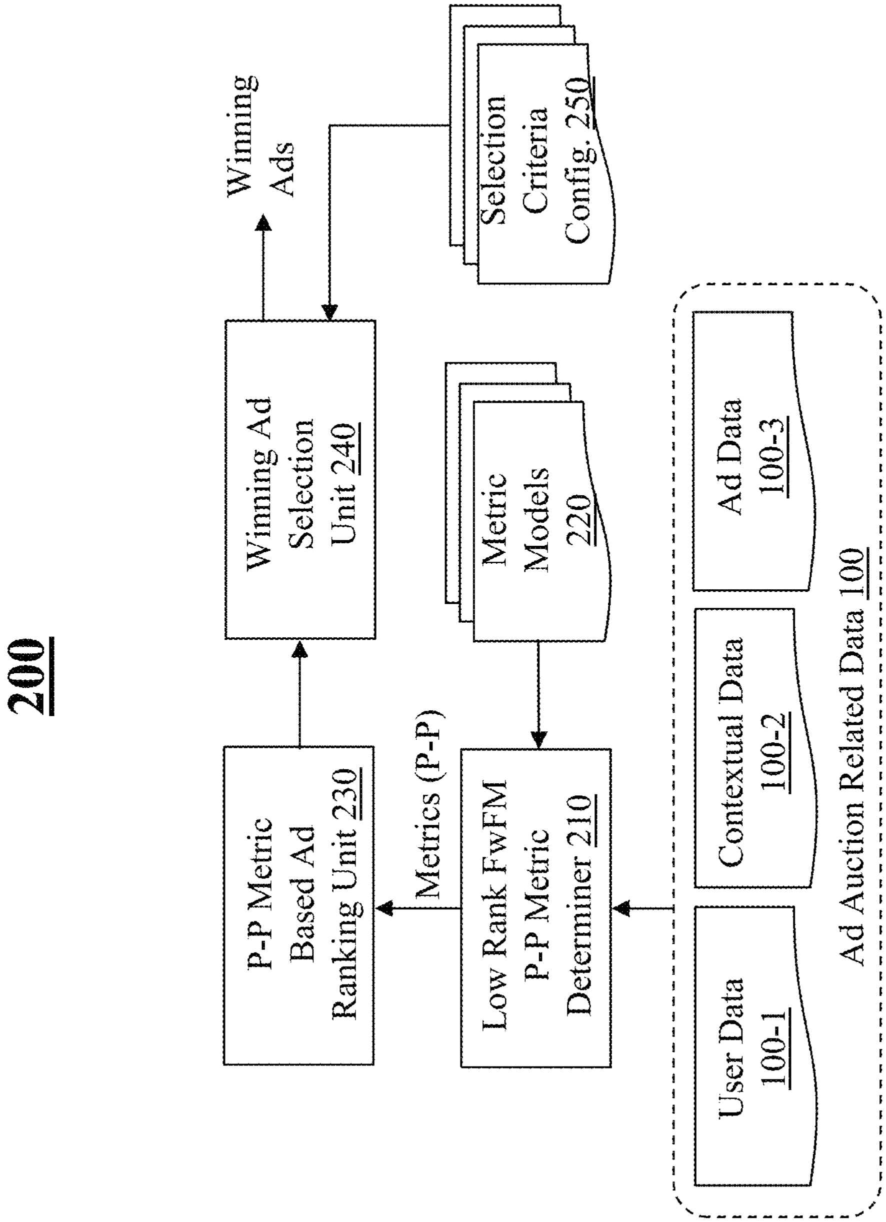
FIG. 2A depicts an exemplary framework of ad recommendation for a display ad opportunity based on predicted performance metrics of candidate ads computed via low rank FwFM, in accordance with an embodiment of the present teaching.

FIG. 2A depicts an exemplary framework 200 of ad recommendation for a display ad opportunity based on predicted performance metrics of candidate ads computed via low rank FwFM, in accordance with an embodiment of the present teaching. In this illustrated embodiment, the framework 200 takes ad auction related data 100 as input, which includes both supply and demand information, and produces a winning ad as a recommendation for a display ad opportunity. As discussed herein, the process of generating a recommended ad (winning ad) is a process of matching supply with demand. To do so, the framework 200 comprises a low rank FwFM P-P metric determiner 210, a P-P metric-based ad ranking unit 230, and a winning ad selection unit 240. The low rank FwFM P-P metric determiner 210 is provided for computing predicted performance metrics (P-P metrics), determined based on metric models stored in 220, based on auction related data for each of the candidate ads that are used to evaluate the candidate ads. The P-P metric-based ad ranking unit 230 is provided for ranking the candidate ads based on their corresponding P-P metrics. The winning ad selection unit 240 is provided for selecting, from the ranked candidate ads, a winning ad in accordance with some selection criteria configured in 250.

Figure 2B:
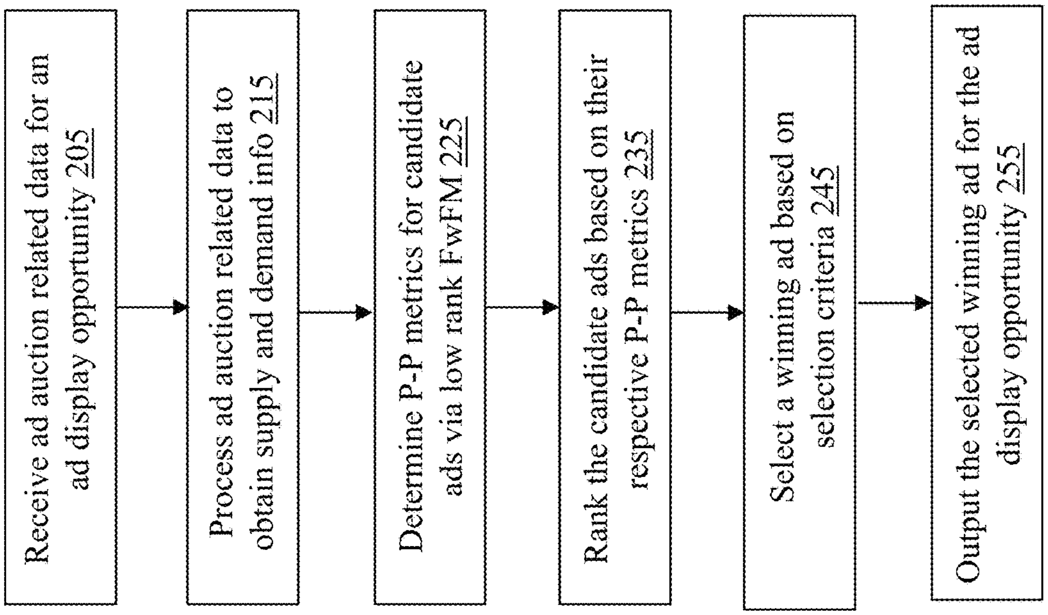
FIG. 2B is a flowchart of an exemplary process of ad recommendation for a display ad opportunity based on predicted performance metrics of candidate ads computed via low rank FwFM, in accordance with an embodiment of the present teaching.

FIG. 2B is a flowchart of an exemplary process of generating an ad recommendation for a display ad opportunity based on predicted performance metrics of candidate ads computed via low rank FwFM, in accordance with an embodiment of the present teaching. In operation, when data 100 from an ad auction is received at 205, the low rank FwFM P-P metric determiner 210 processes, at 215, the ad auction data 100 to obtain supply and demand related information and determines, at 225, the P-P metrics for the candidate ads included in the ad auction data using the low rank FwFM approach according to the present teaching. The computed P-P metrics are then used by the P-P metric-based ad ranking unit 230 to rank the candidate ads at 235. The ranked candidate ads may then be sent to the winning ad selection unit 240 to select, at 245, a winning ad for the auction based on selection criteria configured in 250. The selected winning ad is then output, at 255, as a recommended ad for the display ad opportunity.

Figure 3A:
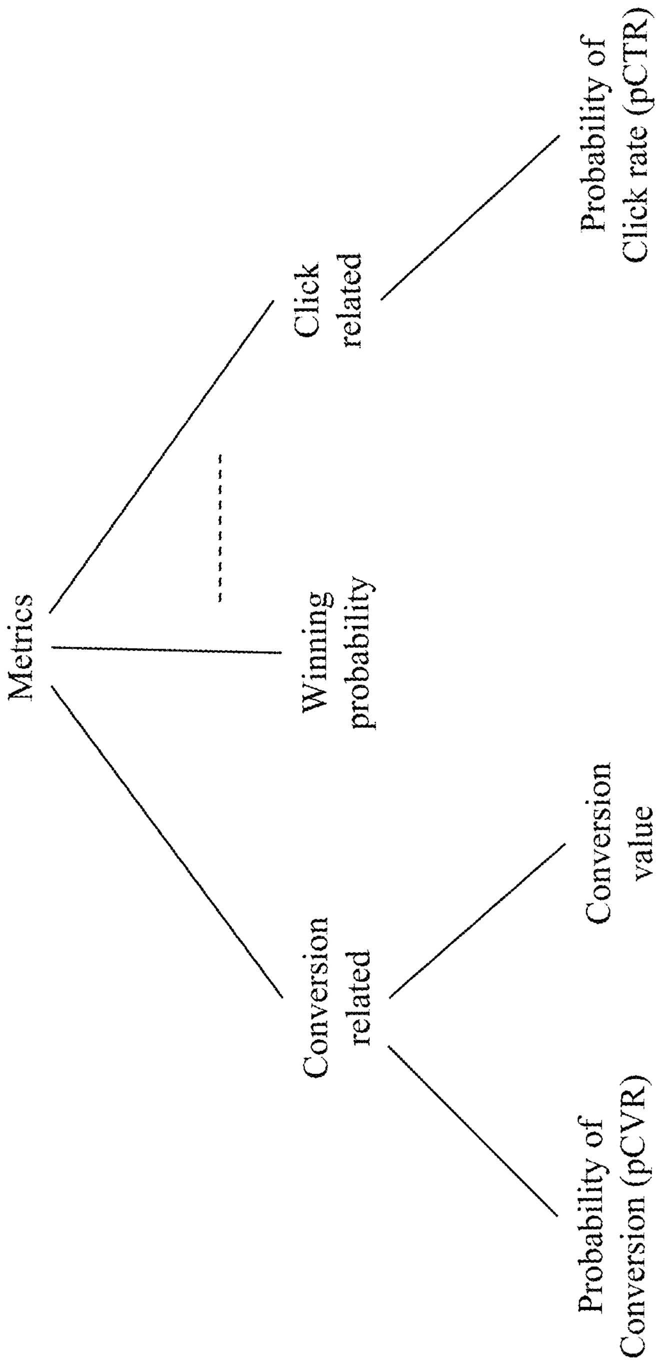
FIG. 3A illustrates exemplary types of metrics that may be used to represent predicted performance of candidate ads.

The P-P metric as computed for each of the candidate ads may be defined according to application needs. FIG. 3A illustrates exemplary types of metrics that may be used to represent predicted performance of candidate ads. For example, in the context of online advertising, one auction system may measure a success in performance in terms of, e.g., conversions. In this case, the performance metric for ranking and selecting a winning ad may be defined as the probability of achieving a conversion (pCVR) given the user, context, and a candidate ad. Based on the same conversion consideration, some systems may determine the P-P metric based on the value of conversion, which may be in some situations related to the value feature of the candidate ad. As another example, a different auction system may consider success based on clicks on the displayed ads so that the performance metric for such a system may be computed in a way that represents a likelihood that the user involved in each auction clicks on an ad displayed thereto (pCTR). In some auction applications, the P-P metric for candidate ads may be based on a probability of winning in the auction.

Figure 3B:
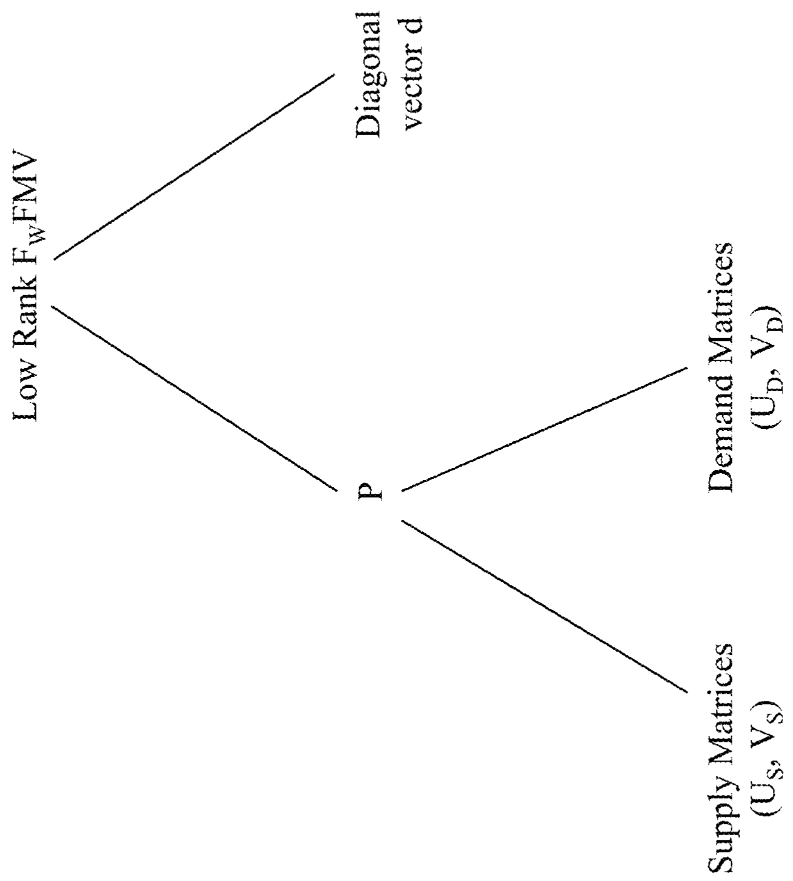
FIG. 3B shows an exemplary construct of computing predicted performance metrics via low rank FwFM, in accordance with an embodiment of the present teaching.

As discussed herein, the present teaching relates to an alternative low rank FwFM formulation to enable the computation of P-P metrics with a reduced rank of the field-interaction matrix rather than pruning small field-interaction weights as in the conventional solutions. Prior to presenting the exemplary detail formulation of the low rank FwFM, FIG. 3B shows conceptually an exemplary construct in computing predicted performance metrics via low rank FwFM, in accordance with an embodiment of the present teaching. As shown in FIG. 3B, the low rank FwFM computation according to the present teaching involves a diagonal vector d and a matrix p, which will be defined in detail below and where p is a matrix generated based on supply matrices $U_S$ and $V_S$, computed based on supply information and demand matrices $U_D$, $V_D$, computed based on demand information. Details related to the construct of the low rank FwFM according to the present teaching are presented below and with reference to FIGS. 4-5.

First, consistent notations are defined in order to define the low rank FwFM. Vectors are herein denoted by lower-case boldface letters, such as x, a, and matrices are defined by uppercase boldface letters, such as P. Vectors defined herein correspond to column vectors. Components of a vector are denoted by indexed lower-case letters, e.g., components of x are expressed as $x_1, \ldots, x_n$. Similarly, components of a matrix P are denoted by $p_{i,j}$. Rows of a matrix $P \in \mathbb{R}^{m \times n}$ are denoted by $P_1, \ldots, P_m$.

The standard inner product between two vectors $x, y \in \mathbb{R}^n$ is denoted as:

$$\langle x, y \rangle = x^T y = \sum_{i=1}^{n} x_i, x_j,$$

and the Euclidean squared norm is denoted by $\|x\|^2 = \langle x,x \rangle$). For a given vector x, the notation diag (x) represents a square diagonal matrix with the components of x on its diagonal. For a given square matrix P, the term keepdiag (P) denotes a diagonal matrix whose diagonal is identical to P. For example, $$x = \begin{pmatrix} 1 \\ 2 \\ -3 \end{pmatrix} \Rightarrow \text{diag}(x) = \begin{pmatrix} 1 & 0 & 0 \\ 0 & 2 & 0 \\ 2 & 0 & -3 \end{pmatrix}$$

Similarly, $$P = \begin{pmatrix} -1 & 3 & 4 \\ 2 & 1 & -1 \\ -3 & -2 & 5 \end{pmatrix} \Rightarrow keepdiag(P) = \begin{pmatrix} -1 & 0 & 0 \\ 0 & 1 & 0 \\ 0 & 0 & 5 \end{pmatrix}$$

The trace of A, denoted by tr(A), is the sum of the elements on the diagonal of A. It is well-known that the trace is invariant under circular shifts of matrix products, namely, $$tr(A_1 A_2 \ldots A_k) = tr(A_k A_1 A_2 \ldots A_{k-1}).$$

The standard inner product between two matrices $A, B \in \mathbb{R}^{m \times n}$ can be written as:

$$\langle A, B \rangle = \sum_{i=1}^{m} \sum_{j=1}^{n} a_{i,j} b_{i,j} = tr(A^T B).$$

A conventional factorization machine in its fast algorithm version is formulated as follows. A FwFM receives an input $x \in \mathbb{R}^m$, and whose learned parameters are the scalar $w_0$, the vector $w \in \mathbb{R}^m$, and the vectors $v_1, \ldots, v_m \in R^k$, which computes:

$$\Phi_{FM}(x) = w_0 + \langle w, x \rangle + \sum_{i=1}^{m} \sum_{j=i+1}^{m} \langle x_i v_i x_j v_j \rangle \quad \text{(FM)}$$

The above naive formula has computational complexity of $O(m^2k)$. Its faster mathematically equivalent corresponds to the following formula:

$$\Phi_{FM}(x) = w_0 + \langle w, x \rangle + \frac{1}{2}\left( \left\| \sum_{i=1}^{m} x_i v_i \right\|^2 - \sum_{i=1}^{m} \|x_i v_i\|^2 \right)$$

The complexity of this faster formulation is O(mk).

Since factorization machines are generally trained on a table with columns representing features such as age, gender, . . . , etc., each component of x originates from some column of the table. These columns are termed fields. In Equation (FM), all features in the input vector x are treated uniformly, i.e., vectors $v_i$, $v_j$ in the inner products $\langle x_i v_i, x_j v_j \rangle$ are the same vectors, regardless whether the inner product represents the interaction between "age" and "gender", or the interaction between "age" and "ad category." Each component of $x_i$ is associated with some field $f_1, \ldots, f_m \in \{1, \ldots, n\}$ representing one of the n columns of the table. A field-weighted factorization machine, or FwFM, may have the same input and parameters as a regular factorization machine, but with additional symmetric field interaction matrix $R^{n \times n}$ as a learnable parameter. A FwFM then computes the following:

$$\Phi_{FM}(x) = w_0 + \langle w, x \rangle + \sum_{i=1}^{m} \sum_{j=1}^{m} \langle x_1 v_i x_j v_j \rangle r_{f_i, f_j}. \quad \text{(FwFM)}$$

As can be seen from this formulation, the computational complexity for FwFM is $O(m^2k)$.

Generally, factorization machines in an ad recommendation system are employed on categorical columns, e.g., columns representing "gender" or "ad category." When numeric feature columns are present, such as the number of ad views in the last two weeks, or the time since the user last visited our site, such numerical columns are transformed to categorical columns via, e.g., quantization. Categorical columns may then be, in turn, encoded as in a one-hot encoding manner. The vector x may be formed through a concatenation of the one-hot encodings of each column in the table, and therefore contains only zeroes and ones. There is typically a unique "1" corresponding to each column in the table, and therefore the pairwise interactions can be written in terms of the fields, rather than the components of x. That is, with respect to FMV: it can be written as:

$$\sum_{i=1}^{m} \sum_{j=i+1}^{m} \langle v_i, v_j \rangle = \frac{1}{2}\left( \left\| \sum_{i=1}^{n} v_i \right\|^2 - \sum_{i=1}^{n} \|v_i\|^2 \right), \quad \text{(FMV)}$$

While with respect to FwFM, it is written as:

$$\sum_{i=1}^{n} \sum_{j=i+1}^{n} \langle v_i, v_j \rangle r_{i,j}. \quad \text{(FmFMV)}$$

Ads are typically recommended to a given user visiting a given site at a given time via an ad auction process. As discussed herein, an auction framework may rank candidate ads according to their respective predicted performance metrics, computed with a help of some trained prediction model, such as a factorization machine or a field-weighted factorization machine. In such a setting, some of the fields may represent the user, the site, and the time of visit. Other fields may represent a candidate ad for which a P-P metric needs to be computed. As discussed herein, in some embodiments, input fields {1, . . . , n} may be partitioned into two sets: supply information and demand information, with S denoting the supply fields (describing the user and the site) and D the demand fields (describing the candidate ads). During an ad auction, all supply fields remain constant—all candidate ads correspond to the same user visiting the same site. The demand fields, however, change for every candidate ad which are likely different.

Based on the equation on (FMV), the term inside the ½(·) parentheses can be de-composed as:

$$\left\|\sum_{i\in S} v_i + \sum_{i\in D} v_i\right\|^2 - \left(\sum_{i\in S}\|v_i\|^2 + \sum_{i\in D}\|v_i\|^2\right)$$

so that the sums over S can be computed only once per auction as they are the same for every candidate ad considered. Given that, for a regular factorization machine, the computational complexity for each candidate ad is O(|D|k). In most auction systems, the number of supply fields |S| may be practically irrelevant as to the complexity especially when there are sufficiently more candidate ads. Given that field-weighted factorization machines FwFMs consider full interactions among different columns, although they have more representation power and are more accurate, they are slower to compute due to complexity so that FwFM in conventional treatment is less appropriate for real-time large scale ad ranking where tens of thousands of ads need to be ranked in a matter of milliseconds.

It is in this context that the present teaching is developed to attain the representation power of FwFM in ad ranking yet derive a computationally feasible scheme suitable for real-time large scale ad ranking. A diagonalized form of a matrix A is given by a matrix U and a vector e as:

$$A = U^T \mathrm{diag}(e) U.$$

Any symmetric matrix can be written in such a diagonalized form according to spectral decomposition theorem. In addition, an extension of the above corresponds to a diagonal plus diagonalized decomposition of a matrix A, given the matrix U and the vectors e, d, $$A = \mathrm{diag}(d) + U^T \mathrm{diag}(e) U.$$

It can be seen that the regular diagonalized form is merely a special case of the above, when, i.e., d is a zero vector. Therefore, any symmetric matrix can also be written in the above form. Such decompositions may be particularly useful when matrix $U\in\mathbb{R}^{c\times n}$ has a small number of rows c. This is referred to as "low rank plus diagonal" (LRPD) decompositions. Occasionally, although a given symmetric matrix A may not be exactly represented for a given small c, it can be approximated reasonably well. As c increases, the approximation quality continually improves until c=n, corresponding to the exact representation corresponding to the spectral decomposition theorem.

The aim is to provide a faster computational formula for the FwFM under the assumption of one-hot encoding and reduces the computational cost from $O(n^2k)$ to O(c|D|k), where D corresponds to the "demand" fields, and c is a constant. The formulation according to the present teaching comprises of two components: (a) an alternative matrix form of writing the field-weighted factorization machine formula (FwFMV), and (b) a diagonal-plus-low-rank approximation of the field interaction matrix R. Embedding the field vectors $v_1, \ldots, v_n$ into the rows of the matrix V and assume that $r_{i,i}=0$. The pairwise inner products $\langle v_i, v_j\rangle$ correspond to the components of the matrix $Q=VV^T$. That is, $q_{i,j}=\langle v_i, v_j\rangle$. With the assumption of $r_{i,i}=0$, by definition, we can write the pairwise sum (FwFMV) as:

$$\begin{aligned}
\sum_{i=1}^{n}\sum_{j=i+1}^{n}\langle v_i, v_j\rangle r_{i,j} &= \frac{1}{2}\sum_{i=1}^{n}\sum_{j=1}^{n}\langle v_i, v_j\rangle r_{i,j} && \leftarrow j \text{ start from } 1 \\
&= \frac{1}{2}\sum_{i=1}^{n}\sum_{j=1}^{n} q_i r_{i,j} \\
&= \frac{1}{2}\langle Q, R\rangle && \leftarrow \text{Definition of inner product} \\
&= \frac{1}{2}\langle VV^T, R\rangle && \leftarrow \text{Definition of Q} \\
&= \frac{1}{2} tr\langle VV^T, R\rangle && \leftarrow \text{Inner product in trace form} \\
&= \frac{1}{2} tr\langle V^T R V\rangle && \leftarrow \text{Circular shift invariance}
\end{aligned} \tag{TR}$$

As discussed herein, learning directly the field interaction matrix R is computational expensive. Instead, as R is symmetric, a diagonal plus low rank approximation may be employed. That is, a matrix $U\in\mathbb{R}^{c\times n}$, for some c, and a vector $e\in\mathbb{R}^c$ may be instead learned as formulated below:

$$R = U^T \mathrm{diag}(e) U - \mathrm{keepdiag}\left(U^T \mathrm{diag}(e) U\right).$$

As the matrix R has a zero diagonal, the diagonal part of R's decomposition corresponds to—keepdiag ($U^T$ diag(e)U). Denoting the diagonal of $U^T$ diag(e)U by d, it can then be rewritten as:

$$R = U^T \mathrm{diag}(e) U - \mathrm{diag}(d)$$

Substituting it into the matrix form in Equation (TR), the following is obtained:

$$\sum_{i=1}^{n}\sum_{j=i+1}^{n}\langle v_i, v_j\rangle r_{i,j} = \frac{1}{2} tr\left(V^T R V\right)$$

-continued $$= \frac{1}{2}tr\left(V^T\left[U^T \operatorname{diag}(e)U - \operatorname{diag}(d)\right]V\right)$$

$$= \frac{1}{2}tr\left((UV)^T \operatorname{diag}(e)(UV)\right) - \frac{1}{2}tr\left(V^T \operatorname{diag}(d)V\right)$$

$$= \frac{1}{2}tr\left(P^T \operatorname{diag}(e)P\right) - \frac{1}{2}tr\left(V^T \operatorname{diag}(d)V\right) \leftarrow \text{Define } P = UV$$

$$= \frac{1}{2}\sum_{j=1}^{c} e_i\|p_i\|^2 - \sum_{i=1}^{n} d_i\|v_i\|^2.$$

Thus, the pairwise interactions $$\sum_{i=1}^{n}\sum_{j=i+1}^{n}\langle v_i, v_j\rangle r_{i,j}$$

may be computed via following steps:

1. Compute d—the diagonal of $U^T$ diag(e)U;
2. Compute P=UV in O(cnk)
3. Compute $$\frac{1}{2}\sum_{j=1}^{c} e_i\|p_i\|^2 - \sum_{i=1}^{n} d_i\|v_i\|^2 \text{ in } O(nk)$$

where step (1) can be computed, as discussed herein, only once upon the model being trained so that it does not affect the computational complexity. It does not depend on any specific user or ad features.

As discussed herein, each row of V corresponds to a field, and thus each column of U corresponds to a field. Given the supply fields S and the demand fields D, matrix V may be split along its rows into two matrices $V_D$ and $V_S$. Correspondingly, U may also be split along the columns into $U_D$ and $U_S$. Because P=UV, we can equivalently compute:

$$P = U_S V_S + U_D V_D.$$

Therefore, the above computational steps become:

1. Compute d—the diagonal of $U^T$ diag(e)U;
2. Compute $P=U_SV_S+U_DV_D$ in O(c|D|k) per ad
3. Compute $$\frac{1}{2}\sum_{j=1}^{c} e_i\|p_i\|^2 - \sum_{i\in S} d_i\|v_i\|^2 - \sum_{i\in S} d_i\|v_i\|^2 \text{ in } O(|D|k) \text{ per ad}$$

That is, the training procedure is now modified according to the present teaching to learn an approximation of R with U and e. Utilizing this modified formulation, the learned decomposition may be used to construct an alternative fast scoring approach for candidate ads, which is equivalent to a FwFM with an approximated matrix R.

Figure 1:
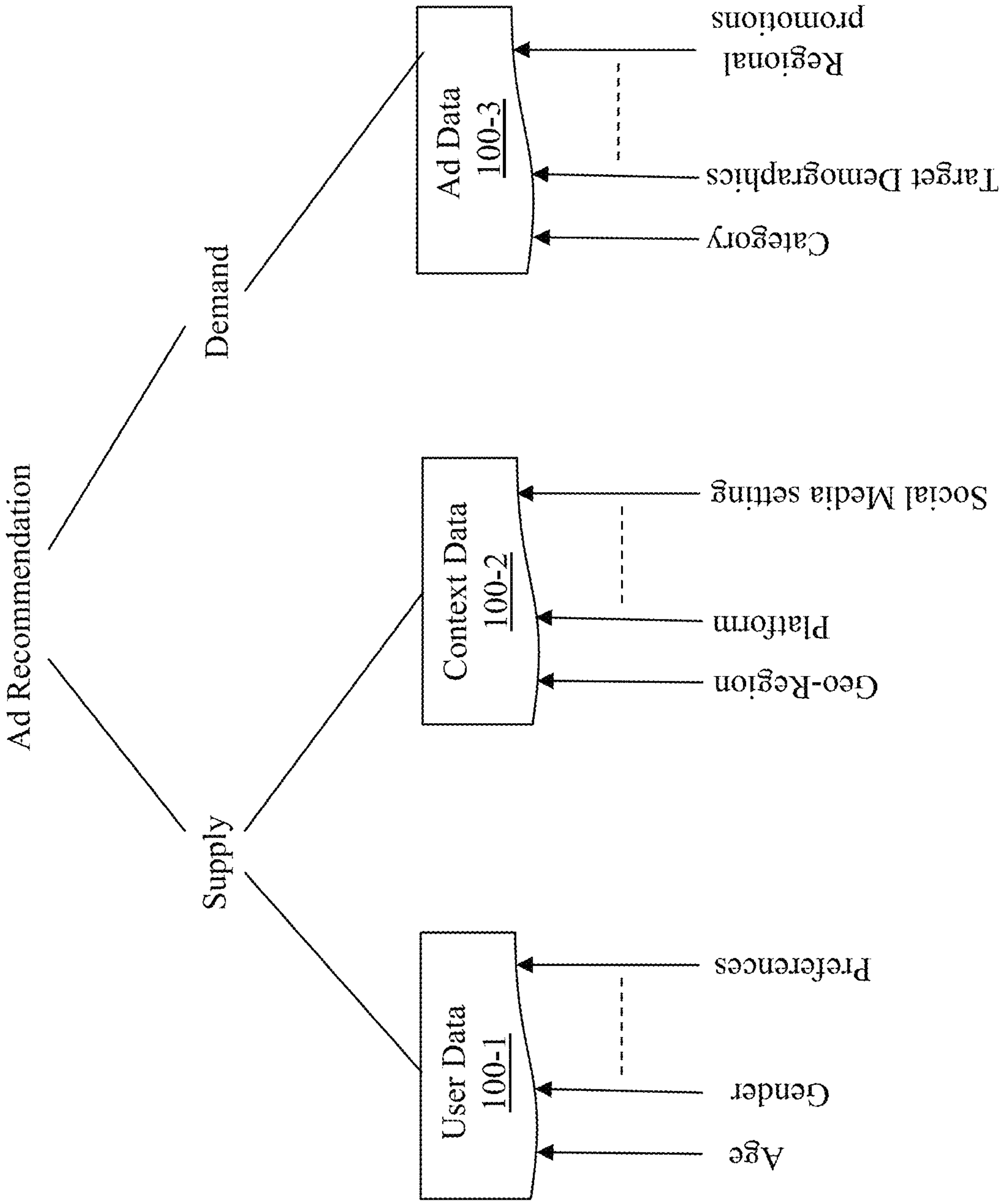
FIG. 1 shows the general concept of ad recommendation as a match between supply and demand.
Figure 4:
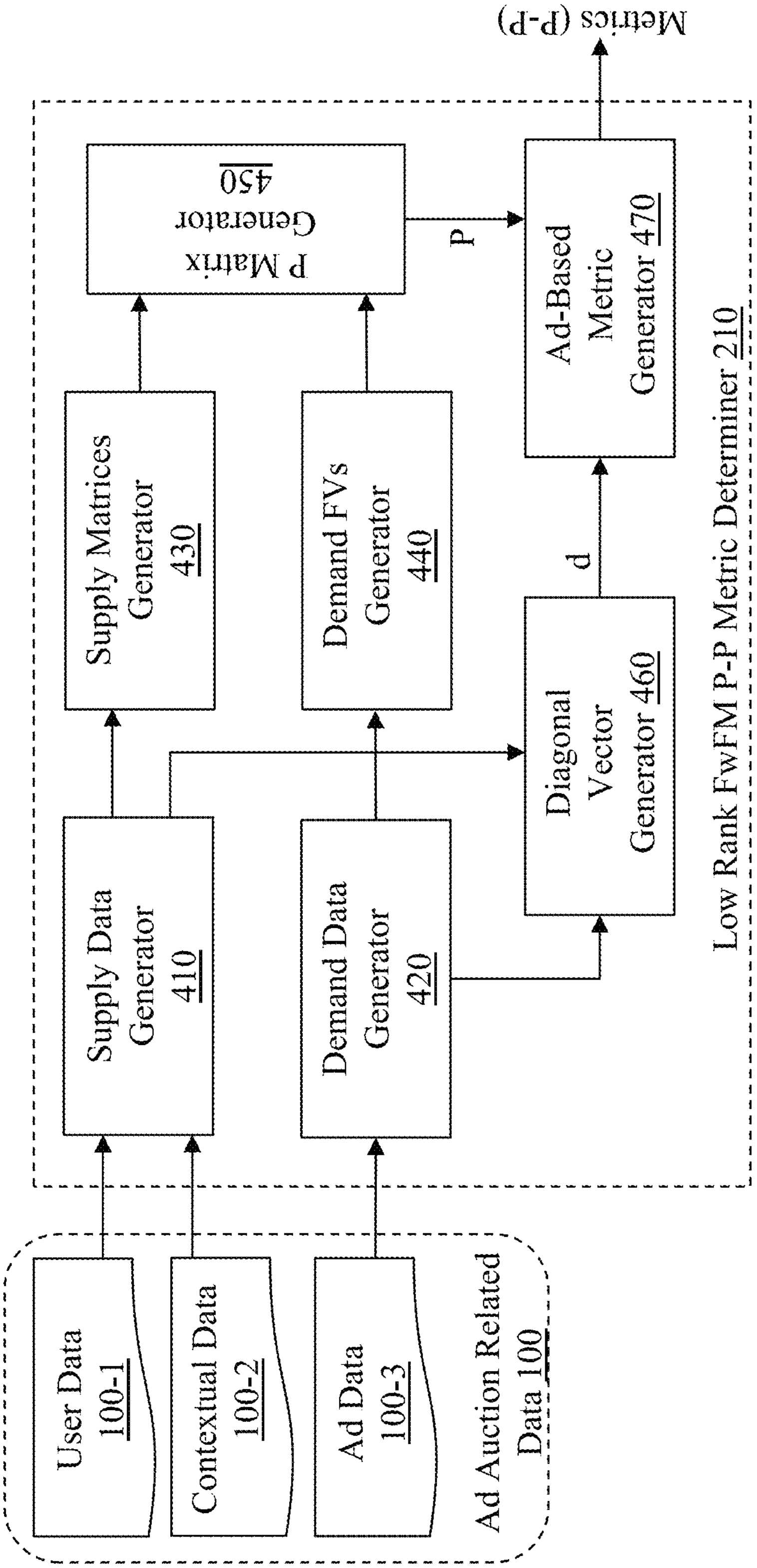
FIG. 4 depicts an exemplary high-level system diagram of a low rank FwFM P-P metric determiner, in accordance with an embodiment of the present teaching.

FIG. 4 depicts an exemplary high-level system diagram of the low rank FwFM P-P metric determiner 210 which is provided to achieve the above fast scoring approach for candidate ads, in accordance with an embodiment of the present teaching. The low rank FwFM P-P metric determiner 210 is constructed to compute the P-P metric for each candidate ad in accordance with the structured computation as discussed herein. In this illustrated embodiment, the low rank FwFM P-P metric determiner 210 comprises a supply data generator 410, a demand data generator 420, a supply matrices generator 430, a demand FVs generator 440, a P matric generator 450, a diagonal vector generator 460, and an ad-based metric generator 470. The supply data generator 410 and the demand data generator 420 are provided for identify, from ad auction related data 100 supply and demand data, respectively, as shown in FIG. 1. The supply matrices generator 430 and demand FVs generator 440 are provided for obtaining, based on the respectively obtained supply and demand data, to compute and generate, respectively, $U_SV_S$ and $U_DV_D$ needed to compute the P matrix as in the step (2) above. The P matrix generator 450 then takes $U_SV_S$ and $U_DV_D$ and compute P matrix as discussed herein for step (2). The diagonal vector generator 460 is provided for computing the diagonal vector d based on the diagonal of $U^T$ diag(e)U as discussed in step (1) above. With the P matrix and d vector computed, the ad-based metric generator 470 computes the P-P metric for a candidate ad according to the formulation in step (3) above in in O(|D|k).

Figure 5:
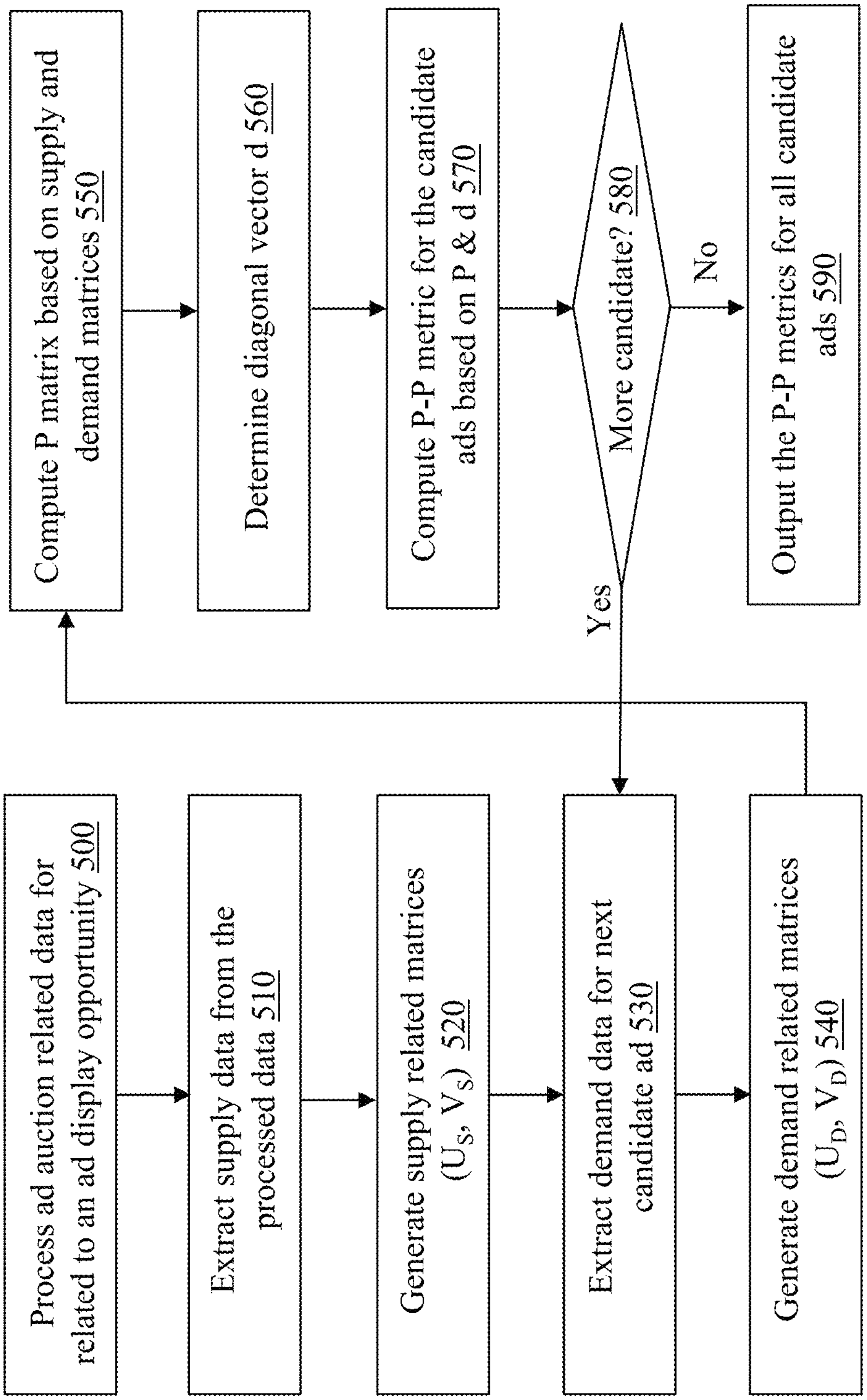
FIG. 5 is a flowchart of an exemplary process for a low rank FwFM P-P metric determiner, in accordance with an embodiment of the present teaching.

FIG. 5 is a flowchart of an exemplary process for the low rank FwFM P-P metric determiner 210, in accordance with an embodiment of the present teaching. The ad auction related data 100 is first processed, at 500, by the supply data generator 410 to extract, at 510, supply data, which is then used by the supply matrices generator 430 to obtain supply related matrices $U_SV_S$. The demand data generator 420 may also be invoked to extract, at 530, demand data for the next candidate ad and provide to the demand matrices generator 440, which obtains, at 540, the demand related matrices $U_DV_D$. Based on the supply and demand related matrices $U_SV_S$ and $U_DV_D$, the P matrix generator 450 computes, at 550, the P matrix according to $P=U_SV_S+U_DV_D$ in O(c|D|k). Based on the supply and demand data, the diagonal vector generator 460 computes $U^T$ diag(e)U, from which the diagonal vector d is determined at 560. The P matrix and the d vector are then used by the ad-based metric generator 470 to compute, at 570, the P-P metric for the current candidate ad according to the formulation in step (3) above. The process repeats for all candidate ads, determined at 580, until the P-P metrics for all candidate ads are computed and output at 590 for ranking the candidate ads.

Figure 6:
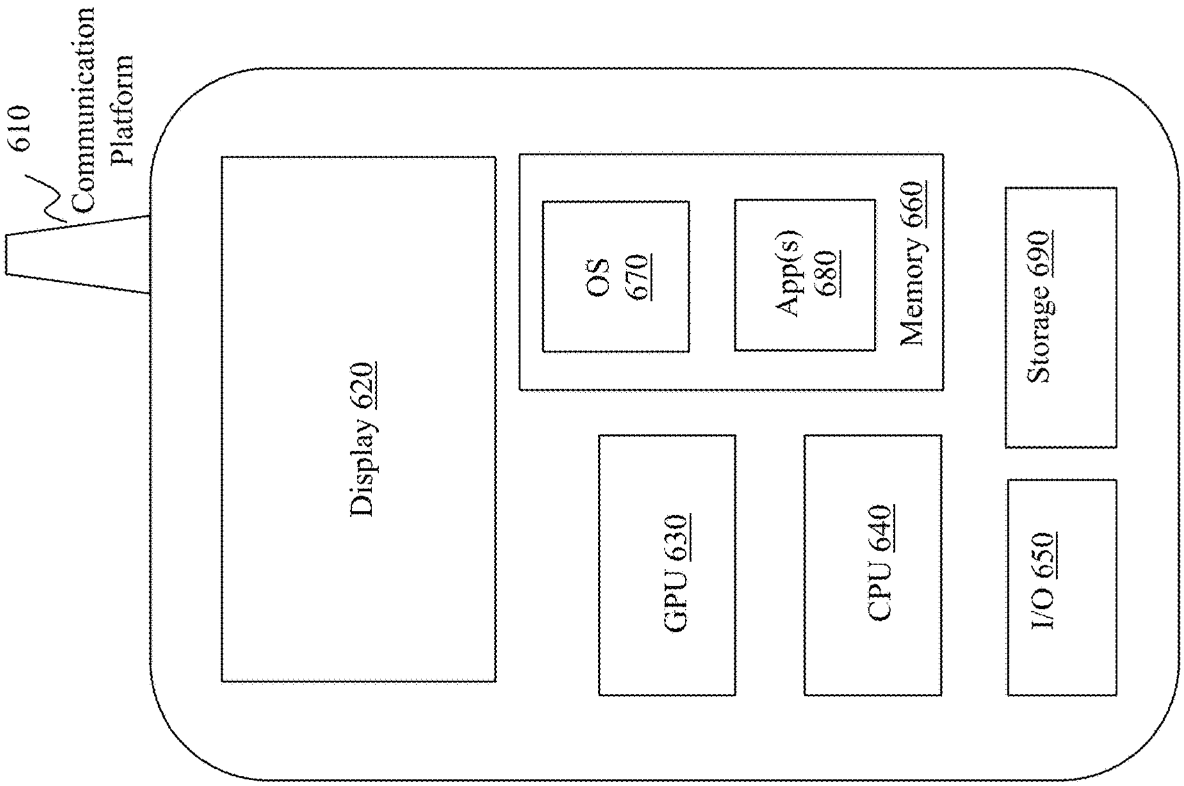
FIG. 6 is an illustrative diagram of an exemplary mobile device architecture that may be used to realize a specialized system implementing the present teaching in accordance with various embodiments.

FIG. 6 is an illustrative diagram of an exemplary mobile device architecture that may be used to realize a specialized system implementing the present teaching in accordance with various embodiments. In this example, the user device on which the present teaching may be implemented corresponds to a mobile device 600, including, but not limited to, a smart phone, a tablet, a music player, a handled gaming console, a global positioning system (GPS) receiver, and a wearable computing device, or in any other form factor. Mobile device 600 may include one or more central processing units ("CPUs") 640, one or more graphic processing units ("GPUs") 630, a display 620, a memory 660, a communication platform 610, such as a wireless communication module, storage 690, and one or more input/output (I/O) devices 650. Any other suitable component, including but not limited to a system bus or a controller (not shown), may also be included in the mobile device 600. As shown in FIG. 6, a mobile operating system 670 (e.g., iOS, Android, Windows Phone, etc.), and one or more applications 680 may be loaded into memory 660 from storage 690 in order to be executed by the CPU 640. The applications 680 may include a user interface or any other suitable mobile apps for information analytics and management according to the present teaching on, at least partially, the mobile device 600.

User interactions, if any, may be achieved via the I/O devices 650 and provided to the various components connected via network(s).

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to appropriate settings as described herein. A computer with user interface elements may be used to implement a personal computer (PC) or other type of workstation or terminal device, although a computer may also act as a server if appropriately programmed. It is believed that those skilled in the art are familiar with the structure, programming, and general operation of such computer equipment and as a result the drawings should be self-explanatory.

Figure 7:
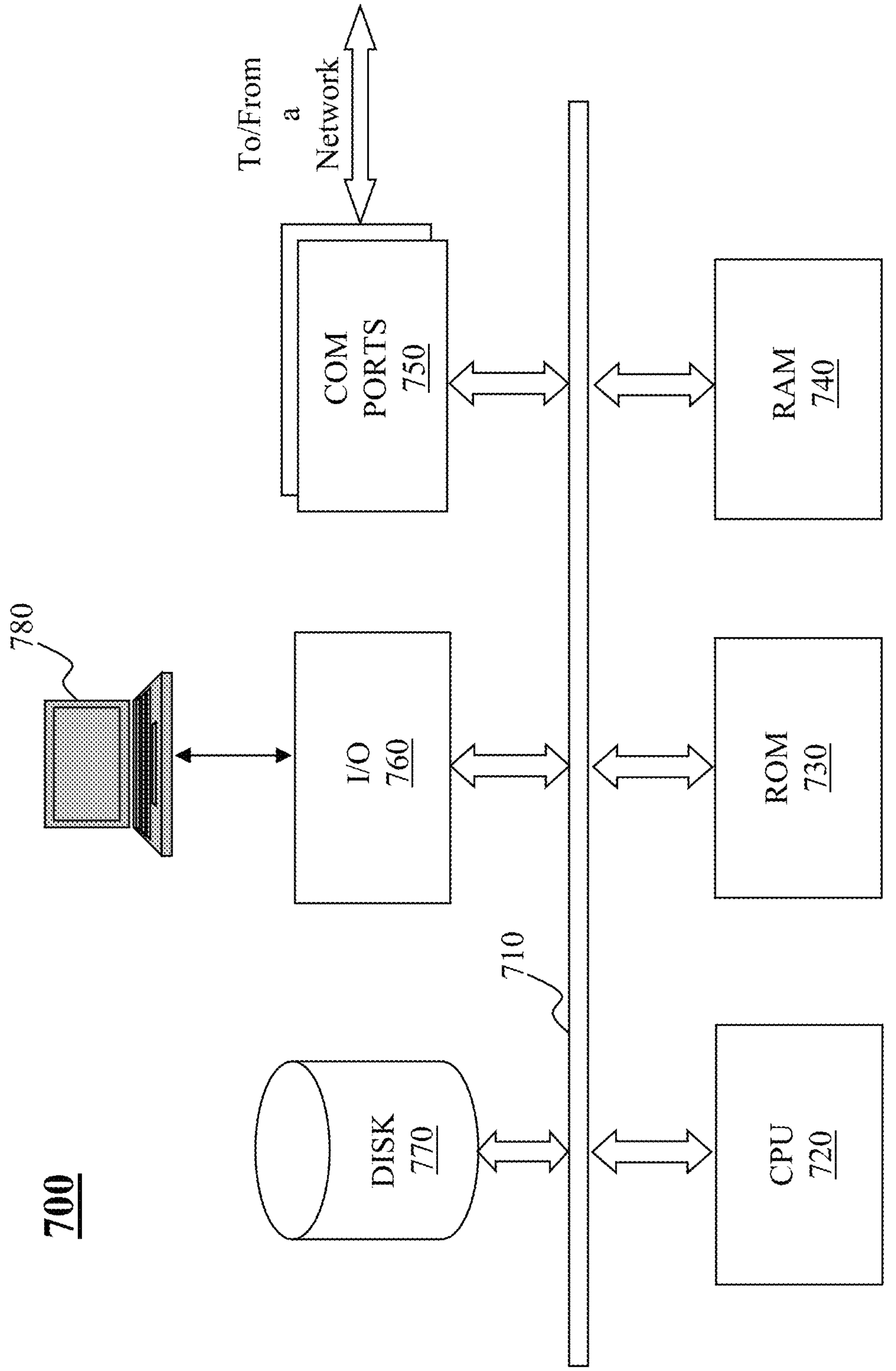
FIG. 7 is an illustrative diagram of an exemplary computing device architecture that may be used to realize a specialized system implementing the present teaching in accordance with various embodiments.

FIG. 7 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general-purpose computer or a special purpose computer. Both can be used to implement a specialized system for the present teaching. This computer 700 may be used to implement any component or aspect of the framework as disclosed herein. For example, the information analytical and management method and system as disclosed herein may be implemented on a computer such as computer 700, via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 700, for example, includes COM ports 750 connected to and from a network connected thereto to facilitate data communications. Computer 700 also includes a central processing unit (CPU) 720, in the form of one or more processors, for executing program instructions. The exemplary computer platform includes an internal communication bus 710, program storage and data storage of different forms (e.g., disk 770, read only memory (ROM) 730, or random-access memory (RAM) 740), for various data files to be processed and/or communicated by computer 700, as well as possibly program instructions to be executed by CPU 720. Computer 700 also includes an I/O component 760, supporting input/output flows between the computer and other components therein such as user interface elements 780. Computer 700 may also receive programming and data via network communications.

Hence, aspects of the methods of information analytics and management and/or other processes, as outlined above, may be embodied in programming. Program aspects of the technology may be thought of as "products" or "articles of manufacture" typically in the form of executable code and/or associated data that is carried on or embodied in a type of machine-readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with information analytics and management. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution, e.g., an installation on an existing server. In addition, the techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

I claim:

1. A method for online advertising with real-time performance-based large scale advertisement ranking and recommendation, comprising:

receiving online ad auction data;

determining, for each of a plurality of candidate ads included in the ad auction data, a predicted performance metric via low rank field weighted factorization machines by:

processing the online ad auction data to identify supply data and demand data;

determining a diagonal vector d based on the supply data and the demand data and from a diagonal component of a low-rank-plus-diagonal approximation of a field interaction matrix;

generating supply related matrices based on the supply data and demand related matrices based on the demand data;

determining a P matrix by summing a product of the supply related matrices and a product of the demand related matrices; and computing the predicted performance metric for each of the plurality of candidate ads based on a formulation including the diagonal vector d and the P matrix, thereby providing a fast scoring approach for the plurality of candidate ads;

ranking the plurality of candidate ads based on their corresponding predicted performance metrics; and selecting one of the ranked plurality of candidate ads as a winning ad according to a predetermined selection criterion and displaying the winning ad via an online platform, so as to support the online advertising with real-time performance-based large scale ad ranking and recommendation.

2. The method of claim 1, wherein:

the supply data is associated with a user and context information related to a display ad opportunity associated with an ad auction; and the demand data is associated with the plurality of candidate ads and includes information characterizing each of the plurality of candidate ads.

3. The method of claim 1, wherein the determining the diagonal vector d comprises:

accessing the supply data and the demand data;

determining a first matrix U and a transpose matrix UT thereof;

obtaining a vector e and a corresponding square diagonal matrix diag (e); and computing a diagonal vector d based on UT diag(e) U, wherein U and e are learned via machine learning based on training data.

4. The method of claim 1, wherein the computing the predicted performance metric for each of the plurality of candidate ad via low rank field weighted factorization machines comprises:

extracting the supply data from the online ad auction data;

based on the extracted supply data, computing a first supply related matrix US, and computing a second supply related matrix VS.

5. The method of claim 4, further comprising:

extracting the demand data from the online ad auction data; and based on the extracted demand data, computing a first demand related matrix UD, and computing a second demand related matrix VD.

6. A machine readable and non-transitory medium having information recorded thereon for online advertising with real-time performance-based large scale advertisement ranking and recommendation, wherein the information, when read by a machine causes the machine to perform the following steps:

receiving online ad auction data;

determining, for each of a plurality of candidate ads included in the ad auction data, a predicted performance metric via low rank field weighted factorization machines by:

processing the online ad auction data to identify supply data and demand data;

determining a diagonal vector d based on the supply data and the demand data and from a diagonal component of a low-rank-plus-diagonal approximation of a field interaction matrix;

generating supply related matrices based on the supply data and demand related matrices based on the demand data;

determining a P matrix by summing a product of the supply related matrices and a product of the demand related matrices; and computing the predicted performance metric for each of the plurality of candidate ads based on a formulation including the diagonal vector d and the P matrix, thereby providing a fast scoring approach for the plurality of candidate ads;

ranking the plurality of candidate ads based on their corresponding predicted performance metrics; and selecting one of the ranked plurality of candidate ads as a winning ad according to a predetermined selection criterion and displaying the winning ad via an online platform, so as to support the online advertising with real-time performance-based large scale ad ranking and recommendation.

7. The medium of claim 6, wherein:

the supply data is associated with a user and context information related to a display ad opportunity associated with an ad auction; and the demand data is associated with the plurality of candidate ads and includes information characterizing each of the plurality of candidate ads.

8. The medium of claim 6, wherein the determining the diagonal vector d comprises:

accessing the supply data and the demand data;

determining a first matrix U and a transpose matrix UT thereof;

obtaining a vector e and a corresponding square diagonal matrix diag(e); and computing a diagonal vector d based on UT diag(e) U, wherein U and e are learned via machine learning based on training data.

9. The medium of claim 6, wherein the computing the predicted performance metric for each of the plurality of candidate ads via low rank field weighted factorization machines comprises:

extracting the supply data from the online ad auction data;

based on the extracted supply data, computing a first supply related matrix US, and computing a second supply related matrix VS.

10. The medium of claim 9, wherein the information, when read by the machine, further causes the machine to perform the following steps:

extracting the demand data from the online ad auction data; and based on the extracted demand data, computing a first demand related matrix UD, and computing a second demand related matrix VD.

11. A system for online advertising with real-time performance-based large scale advertisement ranking and recommendation, comprising:

a low rank field-weighted factorization machine (FwFM) predicted performance (P-P) metric determiner implemented by a processor and configured for receiving online ad auction data;

determining, for each of a plurality of candidate ads included in the ad auction data, a predicted performance metric via low rank field weighted factorization machines by:

processing the online ad auction data to identify supply data and demand data, determining a diagonal vector d based on the supply data and the demand data and from a diagonal component of a low-rank-plus-diagonal approximation of a field interaction matrix, generating supply related matrices based on the supply data and demand related matrices based on the demand data, determining a P matrix by summing a product of the supply related matrices and a product of the demand related matrices, and computing the predicted performance metric for each of the plurality of candidate ads based on a formulation including the diagonal vector d and the P matrix, thereby providing a fast scoring approach for the plurality of candidate ads;

a P-P metric based ad ranking unit implemented by a processor and configured for ranking the plurality of candidate ads based on their corresponding predicted performance metrics; and a winning ad selection unit implemented by a processor and configured for selecting one of the ranked plurality of candidate ads as a winning ad according to a predetermined selection criterion and an output device implemented by a processor and configured for displaying the winning ad via an online platform, supporting the online advertising with real-time performance-based large scale ad ranking and recommendation.

12. The system of claim 11, wherein:

the supply data is associated with a user and context information related to a display ad opportunity associated with an ad auction; and the demand data is associated with the plurality of candidate ads and includes information characterizing each of the plurality of candidate ads.

13. The system of claim 11, wherein the determining the diagonal vector d comprises:

accessing the supply data and the demand data;

determining a first matrix U and a transpose matrix UT thereof;

obtaining a vector e and a corresponding square diagonal matrix diag(e); and computing a diagonal vector d based on UT diag(e) U, wherein U and e are learned via machine learning based on training data.

14. The system of claim 11, wherein the computing the predicted performance metric for each of the plurality of candidate ads via low rank field weighted factorization machines comprises:

extracting the supply data from the online ad auction data;

based on the extracted supply data, computing a first supply related matrix US, and computing a second supply related matrix VS;

extracting the demand data from the online ad auction data; and based on the extracted demand data, computing a first demand related matrix UD, and computing a second demand related matrix VD.

* * * * *